United States Patent [19]

Stewart et al.

[11] Patent Number: 4,552,369

[45] Date of Patent: Nov. 12, 1985

[54] STEM SEALING FOR HIGH PRESSURE VALVE

[75] Inventors: Vernon G. Stewart, Houston; Frank C. Adamek, Pasadena, both of Tex.

[73] Assignee: Gray Tool Company, Houston, Tex.

[21] Appl. No.: 685,439

[22] Filed: Dec. 24, 1984

[51] Int. Cl.[4] .................. F16J 15/06; F16K 41/04
[52] U.S. Cl. ................... 277/226; 277/165; 277/188 A; 277/193; 277/198; 251/214
[58] Field of Search .......... 277/1, 12, 32, 34, 34.3, 277/34.6, 165, 188 R, 188 A, 193, 195, 198, 199, 226; 251/214

[56] References Cited

U.S. PATENT DOCUMENTS

| | | |
|---|---|---|
| 2,727,797 | 12/1955 | Snyder .................. 277/188 A X |
| 2,765,204 | 10/1956 | Josephson ................ 277/188 A |
| 3,222,076 | 12/1965 | Hollingsworth ............. 277/34.3 |
| 3,331,609 | 7/1967 | Moran ................... 277/165 X |
| 4,083,409 | 4/1978 | Barrington ............... 251/214 X |

FOREIGN PATENT DOCUMENTS

| | | |
|---|---|---|
| 1196448 | 5/1959 | France ...................... 277/165 |
| 917381 | 2/1963 | United Kingdom ............. 251/214 |

Primary Examiner—Robert S. Ward
Attorney, Agent, or Firm—Edward L. Kochey, Jr.

[57] ABSTRACT

A stem sealing apparatus having a plurality of inserts (40, 42, 44, 46) for accepting a flowable sealant (52, 54) between deformable seal rings (60, 62). The inserts are loosely stacked (100), and maintained in compression between a packing gland (50) and a shoulder 32. Expansion of the flowable sealant at high temperature cannot shear the inserts apart.

4 Claims, 2 Drawing Figures

STEM SEALING FOR HIGH PRESSURE VALVE

This invention relates to high pressure stem sealing and in particular to a valve which may be subjected to high temperature, for instance high temperature production, steam service, or a fire.

U.S. Pat. No. Re. 29,679 issued to Boyd Boitnott shows a high pressure valve and means for sealing the stem of the valve. It involves the use of a plurality of inserts which are threadedly connected to one another to form a cartridge, and uses injected plastic to provide sealing means. This cartridge has the upper insert trapped by the packing nut and the remainder suspended therefrom. This injected plastic may be a suspension of tetraflouroethylene (Teflon) particles in castor oil, sold by the Chemical Division of Hi-Post Industries under the trade name TFE Seal 104.

When high temperature is experienced by that valve, such as in a fire situation, the injected plastic expands; thereby building-up pressure around each of inserts. This pressure operating on the adjacent insert tends to force the inserts apart. When the valve itself is containing high pressure within its body, the high pressure operates against the series of inserts tending to offset the expansion force. If however this high temperature situation occurs when the valve is not pressurized, there is no offsetting force and the extreme pressure can and has caused threads attaching the inserts to shear. While the lower insert shears loose first, this phenomenon has the potential for the shearing to continue up through the string of inserts.

Since these inserts are snuggly threaded together and the whole series, forming a cartridge, must be inserted within the bore, the concentricity of the threading with the outside diameter of the insert is critical. As a practical matter the cartridge must be machined after assembly to assure the alignment of the outside diameters of all of the cartridges.

Accordingly, the prior art structures experience difficulty in operating in inadvertent high temperature situations and are furthermore expensive to fabricate.

SUMMARY OF THE INVENTION

The invention comprises a stem sealing apparatus for high pressure valve with the valve having a bore through its bonnet and a moveable valve stem passing therethrough. There is an upwardly facing shoulder toward the lower end of the bore. A plurality of loosely stacked cylindrical inserts are placed within the bore resting on the shoulder. Each of the intermediate inserts has an exterior and interior annular cavity, and means for injecting a flowable plastic into these cavities. Seal rings are located between the adjacent inserts with each seal ring comprising of a deformable central seal member and upper and lower anti-extrusion rings. Each deformable seal member is sized to contact both the insert periphery and the adjacent bore or stem, without axial compression. The inserts are sized so that they are in metal to metal contact between the abutting surfaces with no axial compression of the seal members. A packing gland threadedly connected to the bonnet compresses the stack of inserts until there is metal-to-metal contact between the abutting surfaces of the inserts.

This places the entire column of inserts in compression between the packing gland nut and shoulder in the bonnet. Accordingly, while expansion of the flowable plastic under high temperature conditions tends to push the inserts apart, such motion is resisted, not by any connection between the inserts, but by the packing gland and the shoulder of the bonnet. Accordingly, failure between adjacent inserts is avoided.

Since the inserts are not threaded together they may be loosely stacked with reasonable diametral tolerance. Accordingly, each insert need only be machined to have the appropriate outside and inside diameters and there is no concern of concentricity of this machine with any threads. It follows that additional remachining after joining the inserts if not required.

DESCRIPTION OF THE PREFERRED EMBODIMENT

Figure 1:
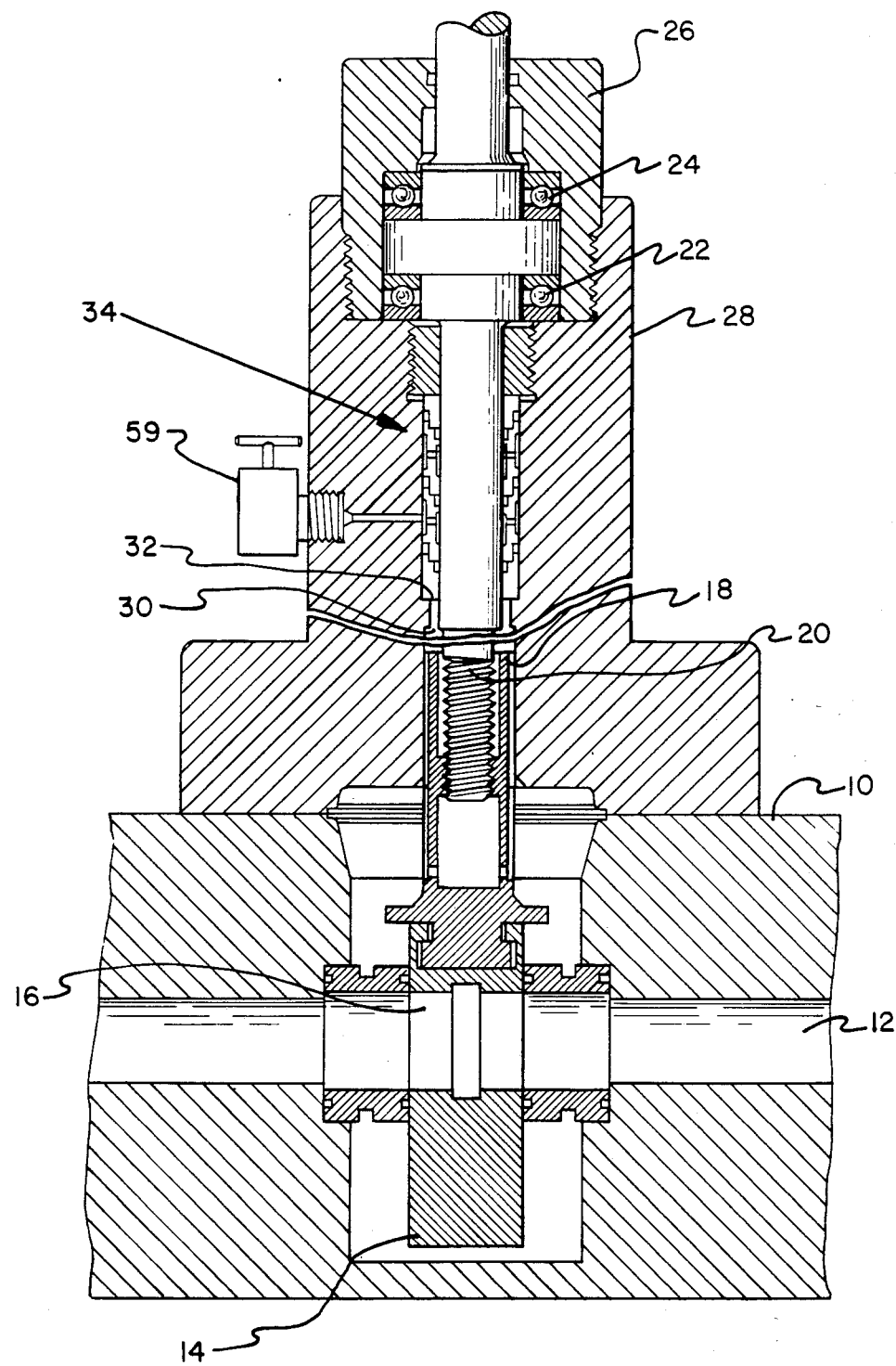
FIG. 1 is a sectional side elevation of a valve showing the sealing arrangement.

Valve body 10 has an opening 12 passing therethrough for the flow of fluids. A sliding gate 14 has an opening 16 which may be aligned with the opening 12 to permit flow of fluids, or the gate may be moved upwardly so that the opening is sealed off.

Gate carrier 18 is threadedly connected to the nonrising valve stem 20 so that rotation of the stem raises or lowers the gate carrier. The valve stem 18 is further supported on the valve stem bearings 22 and 24 and retained by bearing retainer 26. The bearing retainer is threadedly connected to valve bonnet 28.

Figure 2:
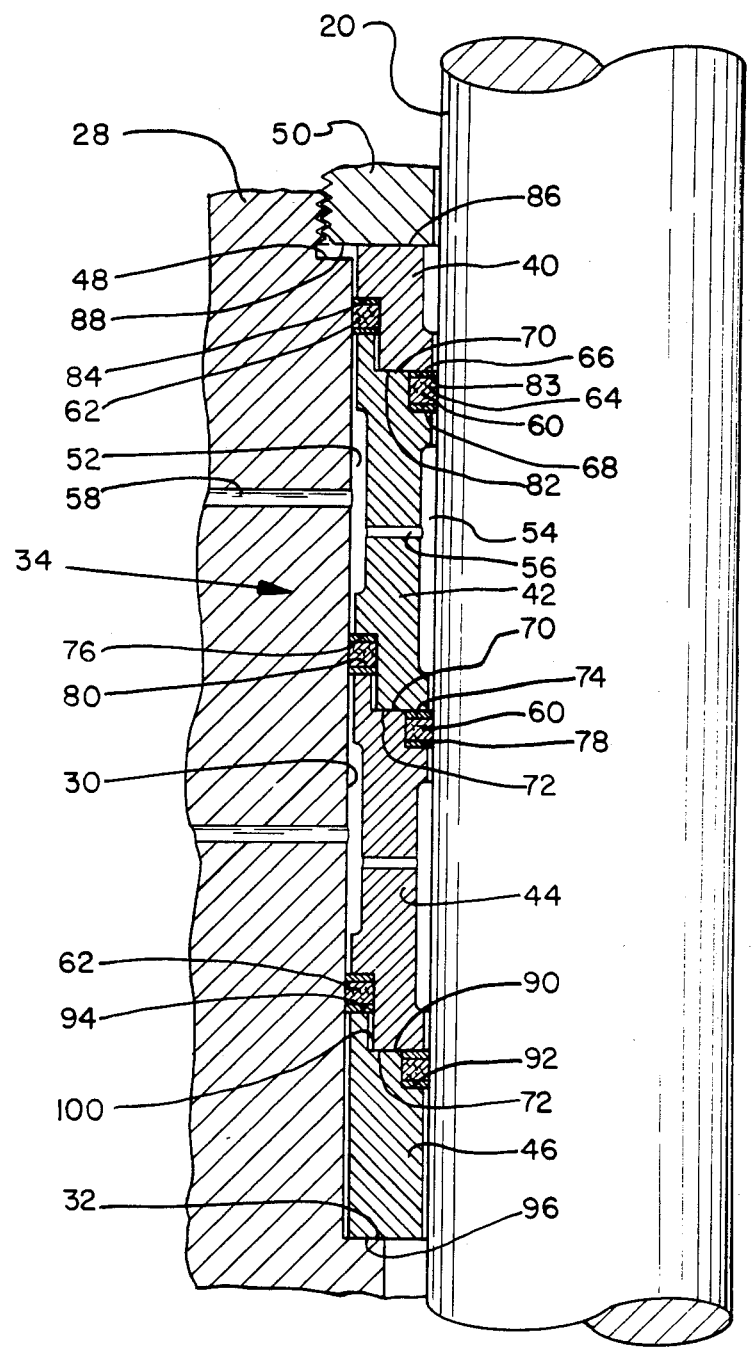
FIG. 2 is a sectional side elevation of a detail of a seal arrangement similar to that of FIG. 1.

The valve bonnet 28 has a bore 30 passing therethrough with an upwardly facing shoulder 32 toward the lower end of the bore. A packing cartridge indicated generally as 34 seals the annular space between the bonnet bore 30 and the valve stem 20. The details of this cartridge are better seen in the expanded view of FIG. 2. A plurality of cylindrical inserts 40, 42, 44, and 46 are located within the bore 30 and surrounding the valve stem 20. Each of these has an outside diameter slightly less than that of the bore and an inside diameter slightly greater than that of the valve stem. The axial dimensions of these inserts is such that with the lower insert 46 resting on the shoulder 30, the upper insert 40 extends beyond shoulder 48 sufficiently that packing gland 50 does not abut shoulder 48 when compressing the cartridge 34.

Each of the intermediate inserts 32, 34 has an exterior annular cavity 52 and an interior annular cavity 54 with the two cavities being fluidly interconnected by a drilled hole 56. Means for injecting 58 a flowable sealant is provided in the form of an opening through the bonnet and valve 59 whereby the sealant may be forced in under pressure from external means. This sealant is preferably a compound known as TFE 104 comprised of 80% castor oil and 20% Teflon particles suspended therein. This sealant has the characteristics that is a semi-solid very viscous material. This sealant is retained within the cavity by closing valve 59.

A plurality of seal rings includes a plurality of inner seal rings 60 and a plurality of outer seal rings 62. Each seal ring includes a deformable central seal member 64 of a material such as tetraflouroethylene. Each ring also includes an upper anti-extrusion ring 66 and a lower anti-extrusion ring 68. Each of these is designed for zero clearance with respect to the stem 20 in the case of the inner seal rings and the bore 30 in the case of the outer seal rings. These anti-extrusion rings are specially designed to obtain the zero clearance by using a pair of split rings spot welded together with the openings out of phase.

Each of the intermediate inserts 42 and 44 has an upper insert abutting surface 70 and a lower insert abutting surface 72 for abutting the adjacent insert. These surfaces are centrally located with respect to the diameter. Each of intermediate inserts also has a lower seal retaining surface 74 an an inboard location and a lower seal retaining surface 76 at an outboard location. Each also has an upper seal retaining surface 78 at an inboard location and an upper seal retaining surface 80 at an outboard location.

The upper insert 40 has similar downwardly facing surfaces. It has a lower insert abutting surface 82 at a central location and downwardly facing seal retaining surfaces 83 and 84 at inboard and outboard locations respectively. At the upper end of the bore insert is a gland abutting surface 86 against which the lower surface 88 of the gland nut 50 operates.

The lower insert 46 has upwardly facing surfaces similar to the intermediate inserts. It has a centrally located insert abutting surface 90 and upwardly facing seal retaining surfaces 92 and 94 at inboard and outboard location respectively. The lower end of the lower insert 46 has a downwardly facing surface 96 for abutting and being restrained by the upwardly facing shoulder 32 of the bore.

In the operating condition, packing gland 50 is screwed down against the cartridge 34 with the inserts touching on the insert abutting surfaces and compressed against the upwardly facing shoulder 32. The cartridge is sized so that the over all length of the cartridge is greater than the distance between surface 32 and 48, whereby the packing gland surface 88 maintains clearance from surface 48. This provides unquestionable precompression of the inserts to the extent desired by applying a torque wrench to packing gland 50.

Each of the seal rings in the uncompressed condition is less than the distance between the spaced apart seal retaining surfaces such as 74 and 78. There is no need for compression of the seal when the inserts are compressed. The seal members 64 have an initial interference fit because of their radial sizing. They are further energized by axial compression caused by pressure differential acting across the seal ring.

In the embodiment illustrated, the inserts are nested with a vertical extending interface 100 between the adjacent inserts. This interface should have generous tolerance so that the adjacent inserts may freely adapt themselves to the diameters of the stem 20 and the bore 30.

The nesting arrangement facilitates assembly of the cartridge for placing it in the valve bore. The recessed seal retaining surfaces provide locations for the seal rings away from the opening between the adjacent inserts to avoid the possibility of the seal ring being pinched therein and also provide centralization of the seal members during assembly. This is particularly important for the inner seal rings 60, since the stem is not in place when the inserts are installed. It would be possible to loosely thread these inserts together providing the threads had substantial vertical and horizontal clearance, thereby operating only to loosely maintain the cartridge together prior to insertion into the bonnet.

Furthermore, it is not essential that the cartridges be nested within one another but could be arranged so that both the inner and outer seal rings are on the same elevation. In such a situation, the opening between the adjacent inserts would be immediately adjacent to the seal and appropriate provisions must be made to the preclude the seal being pinched within these openings during assembly.

The stem sealing arrangement for the high pressure valve is assembled as follows. The seal ring members 64 are placed on each insert along with the entraped anti-extrusion ring. The other anti-extrusion ring may be added depending on the orientation of the valve bonnet. The entire cartridge is inserted into the bore and tightened with a preselected torque level applied to packing nut 50. The valve stem is thereafter inserted and fastened in place.

The plastic sealant is injected at predetermined pressure levels into the annular spaces surrounding the upper insert 42 and the lower insert 44. These may be at staged pressure levels compared to the design pressure of the valve. For instance, if the valve design pressure was 20,000 psi, the sealant around the lower cartridge could be injected to a pressure of 15,000 psi and the pressure surrounding cartridge 42 could be injected into a level of 8,000 psi. This reduces the pressure holding requirements of each of the seal rings. It is possible, however, to inject each of annular spaces to a pressure level approximating that of the valve design pressure. If the seals are capable of holding this pressure, the valve stem would be effectly sealed. Should they, however, leak to a certain extent the staged pressure level previously described would automatically occur.

In the event of a fire in the area of the valve, the bonnet will heat and the plastic sealant in each of the cavities will increase in pressure. This will operate to tend to separate the inserts due to the action on the seal rings. They will not be able to separate, however, because of the precompression between the packing nut 50 and shoulder 32. Accordingly, the failure experienced with the prior art valve will not occur.

We claim:

1. A stem sealing apparatus for a high pressure valve, said valve having a bonnet and a moveable valve stem passing therethrough, comprising;
   a bore through the bonnet;
   an upwardly facing shoulder toward the lower end of said bore;
   a packing gland threadedly connect to said bonnet;
   a plurality of loosely stacked cylindrical inserts surrounding said valve stem within said bonnet, and including a upper insert, a lower insert, and a plurality of intermediate inserts;
   each of said inserts having an outside diameter less than the diameter of the bore of said bonnet, and an inside diameter greater than the outside diameter of the stem;
   each of the intermediate inserts having an exterior annular cavity, an interior annular cavity, said exterior and interior cavities being fluidedly connected to one another, an upper and a lower insert abutting surface for abutting adjacent inserts, the insert abutting surfaces being centrally located with respect to the radial dimension, an upper and a lower seal retaining surface located at both the inboard and outboard radial dimensions;
   said upper insert having a lower insert abutting surface for abutting the adjacent insert, and lower seal retaining surfaces located both at the inboard and outboard locations with respect to the radial dimensions;

said lower insert having an upper insert abutting surface for abutting the adjacent insert, and upper seal retaining surfaces located at both the inboard and outboard locations with respect to the radial dimension;

means for injecting and retaining a flowable sealant material into said annular cavities;

a plurality of seal rings including a plurality of inner seal rings located between said adjacent inserts adjacent the inboard seal compressing surfaces and a plurality of outer seal rings located between adjacent inserts adjacent the outboard seal compressing surfaces;

each seal ring including a deformable central seal member and an upper and a lower anti-extrusion ring, each anti-extrusion ring having zero clearance from the adjacent bore or stem;

the thickness of said seal rings in the uncompressed condition being less than the distance between the spaced apart seal compressing surfaces.

2. A stem sealing apparatus as in claim 1: the thickness of said seal rings in the uncompressed condition being less than the distance between the spaced apart seal retaining surfaces.

3. A stem sealing apparatus as in claim 1: each insert having at least one end, a seal retaining surface and the insert abutting surface at different elevations with adjacent inserts nesting within one another.

4. A stem sealing apparatus as in claim 3: the seal retaining surfaces of adjacent inserts being at an elevation with respect the insert abutting surface, a distance at least as great as the vertical thickness of the seal ring located at the respective seal ring retaining surface, whereby no part of said seal rings will not be located at the elevation of said insert abutting surfaces.

* * * * *